A. G. NORTON.
PRUNING SAW.
APPLICATION FILED FEB. 12, 1912.
1,058,327.
Patented Apr. 8, 1913.
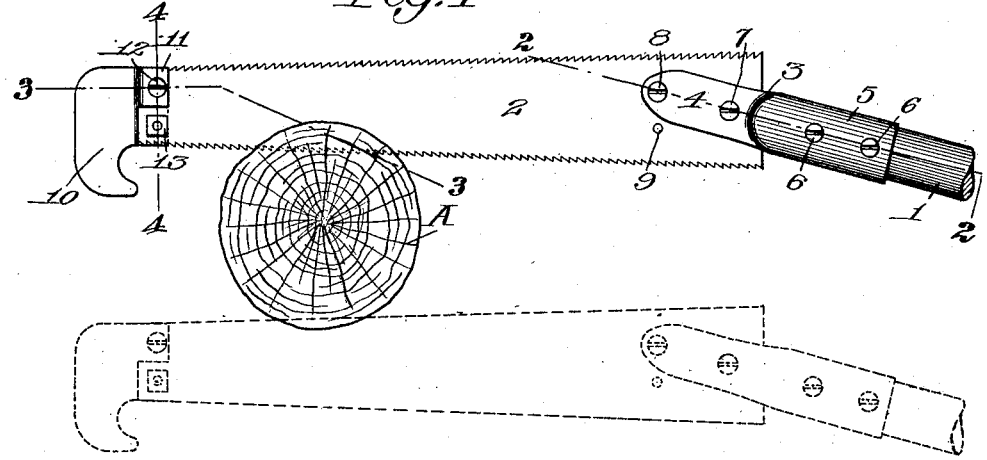
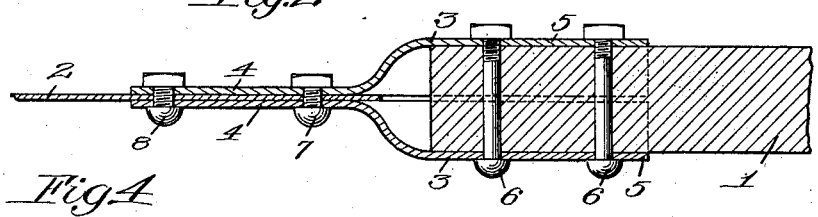
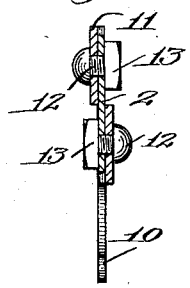
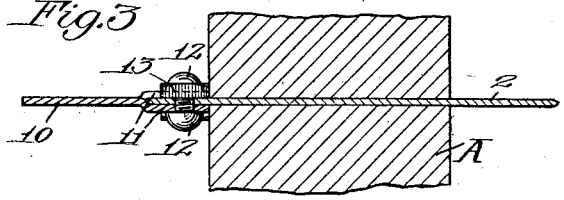
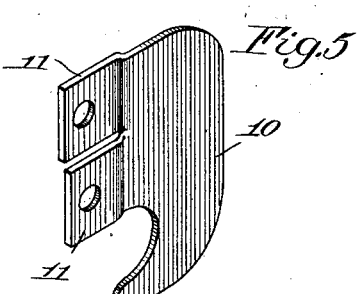
Witnesses
Nelson H. Cpp
Russell B. Griffith
Inventor
Arthur G. Norton
By
his Attorneys
COLUMBIA PLANOGRAPH CO., WASHINGTON, D. C.

UNITED STATES PATENT OFFICE.

ARTHUR G. NORTON, OF WEST WEBSTER, NEW YORK, ASSIGNOR TO NICHOLAS C. SCHIED, OF ROCHESTER, NEW YORK.

PRUNING-SAW.

1,058,327. Specification of Letters Patent. Patented Apr. 8, 1913.

Application filed February 12, 1912. Serial No. 676,961.

*To all whom it may concern:*

Be it known that I, ARTHUR G. NORTON, of West Webster, in the county of Monroe and State of New York, have invented certain new and useful Improvements in Pruning-Saws; and I do hereby declare the following to be a full, clear, and exact description of the same, reference being had to the accompanying drawings, forming a part of this specification, and to the reference-numerals marked thereon.

My present invention relates to horticultural implements and more particularly to pruning implements, and it has for one of its objects to provide a cheap, simply constructed and serviceable pruning saw adapted more particularly for the heavier pruning work, such as removing limbs and branches from fruit and other trees.

A further object of the invention is to fit the saw in a simple and convenient manner with an attachment for moving the branches about or drawing them out of the tree and to so construct the same with relation to the saw that it will not interfere with the sawing operation.

To these and other ends the invention consists in certain improvements and combinations of parts, all as will be hereinafter more fully described, the novel features being pointed out in the claims at the end of the specification.

In the drawings: Figure 1 is a side elevation of a pruning saw constructed in accordance with and illustrating one embodiment of my invention, the same being shown in operative relation to a limb that it is desired to sever; Fig. 2 is an enlarged section taken substantially on the line 2—2 of Fig. 1; Fig. 3 is an enlarged detail section taken substantially on the line 3—3 of Fig. 1, the saw blade being at its limit of movement in the cut; Fig. 4 is a section taken substantially on the line 4—4 of Fig. 1, and Fig. 5 is a perspective view of the limb manipulating attachment.

Similar reference numerals throughout the several figures indicate the same parts.

Referring more particularly to the drawings, 1 indicates a preferably round handle which may be made of suitable length to enable the user to reach the desired height from the ground, said handle having a saw blade 2 carried at the end thereof. The blade and handle are connected together, in the present instance, by means of a pair of plates 3 that may be produced at low cost by stamping or forming them out of sheet metal. Each plate consists of an outer flat portion 4 that lies against one face of the inner end of the blade 2 and an inner semi-tubular socket portion 5 which partially surrounds the outer end of the handle 1, the two socket pieces together practically completely surrounding the said handle to which they are secured by bolts 6 passing through them and through the handle so that they firmly clamp the handle between them. The flat blade attaching portions are also perforated at longitudinally spaced points to receive bolts 7 and 8 that draw them together and clamp the blade securely between them. Only one aperture in the saw blade 2 is provided for the inner bolt 7, but there are preferably two of such apertures, one of which is shown at 9 in Fig. 1, for the outer bolt 8, which two apertures are spaced in a direction laterally of the blade so that the inclination of the latter relatively to the handle may be reversed by transferring the bolt 8 from one to the other of the apertures 9, as will be understood from an inspection of Fig. 1, there being a relative pivotal movement of the saw blade and handle about the bolt 7 during this adjustment. This adjustment of the angular relation of the blade and handle is of utility in that, while I have shown a double-edged saw one edge thereof is used more frequently than the other, as will be hereinafter pointed out, and hence it is desirable to reverse their relationship at times in order that the sharper edge may be brought into the position entailing more frequent use, while the angular position itself makes it much easier to retain the saw on the limb or work piece while the handle is held at a natural and convenient angle by the user standing on the ground.

The blade 2 is preferably mounted for use as a draw-saw, and at the outer or free end has secured thereto a hooked plate 10 curved inwardly toward the handle which is used to pull the branches out of the tree after they have been severed and to break off dead branches that it is impractical or inexpedient to saw. This hook may be also stamped and formed from sheet metal and is provided at its inner end with two attaching portions, in the present instance in the form of ears, 11 offset in opposite directions from the general plane of the hook or plate so that they bear upon opposite faces of the blade 2. One of the advantages of this relationship is that it brings the saw blade in the plane of the hook 10 and thus, when the hook is engaged with a branch, the strain on the blade is central and there is no tendency for the latter to buckle. Each ear 11 is perforated to receive a bolt 12 that also passes through an aperture in the blade 2 and clamps the hook and blade together. As it is expedient to construct the hook plate 10 and the blade 2 from relatively thin sheet materials of substantially the same thickness, there would be a tendency, were not provision made against it, for the plate 10, or at least the attaching portions 11 thereof, to become jammed in the kerf opened by the saw at the end of the cutting or draw stroke. I, therefore, provide an abutment at the outer end of the blade that projects laterally thereof a greater distance than does either of the ears 11 which is so positioned as to engage the limb or work piece and prevent further movement of the blade into the kerf before the ears 11 have an opportunity to enter the latter. This abutment may be conveniently and economically formed by the removable head or nut 13 of each bolt 12 and the said head or nut is, therefore, of sufficient thickness to prevent it from having any tendency to enter the relatively narrow kerf and of such a diameter or so positioned that its inner face is in alinement with or in advance of the corresponding edge of the adjacent attaching ear 11, as clearly shown in Fig. 1.

The operative position of the saw blade 2 relatively to the limb A during the major portion of the cut is shown in full lines in Fig. 1, that is, the saw is reciprocated on top of the limb with its lower edge on the inner angle formed by the blade and handle in use. If a heavy limb is sawed straight through in this way, however, the weight of the severed portion will have a tendency to split the stump portion on the underside just before the cut is completed thereby injuring the stump and making it difficult for it to heal properly. In such an instance it is preferable, therefore, to make a shallow preliminary cut on the underside of the limb before the main cut is started, as indicated in dotted lines in Fig. 1, so that the final fracture will occur nearer the heart of the wood and it is in this way that the upper edge of the saw is utilized in addition to its use after the reverse adjustment previously described has been made. It will be readily seen that the handle 1 is held at the same angle, substantially, for this undercut. Whichever edge is being used, however, one or the other of the abutments 13 is present to prevent the adjacent attaching ear 11 from entering the kerf.

A saw constructed in accordance with my invention may be made very light at the same time being strong and durable and can be manipulated about among thick branches with great facility and operated effectively with slight exertion.

I claim as my invention:

1. In a pruning saw, the combination with a saw blade, of a flat plate forming a hook at the outer end of the blade entirely supported thereby and having an attaching portion secured against a face of the latter, and an abutment extending outwardly from the face of the blade a greater distance than the attaching portion and positioned to engage the work piece in advance of the attaching portion during the sawing operation.

2. In a pruning saw, the combination with a saw blade, of a flat plate forming a hook at the outer end of the blade entirely supported thereby and having an attaching portion bearing against a face of the latter, a securing device connecting said parts together and an abutment on the securing device extending outwardly from a face of the blade a greater distance than the attaching portion of the hook and positioned to engage the work piece in advance of the attaching portion during the sawing operation.

3. In a pruning saw, the combination with a saw blade, of a hook shaped sheet metal plate at the outer end thereof entirely supported thereby having an attaching portion bearing against a face of the blade and a bolt extending transversely through the blade and attaching portion and provided with a head of greater thickness than the latter positioned to engage the work piece and prevent the plate from entering the kerf made by the blade.

4. In a pruning saw, the combination with a saw blade, of a fixed but separate hooked shaped sheet metal plate at the outer end thereof supported solely by the blade and having offset attaching ears lying in different parallel planes to bear against opposite sides of the blade at opposite edges thereof.

ARTHUR G. NORTON.

Witnesses:
 Russell B. Griffith,
 G. Willard Rich.

---

Copies of this patent may be obtained for five cents each, by addressing the "Commissioner of Patents, Washington, D. C."